(12) United States Patent
Venkatasubrahmanyam (10) Patent No.: US 7,975,298 B1
(45) Date of Patent: *Jul. 5, 2011

(54) SYSTEM, METHOD AND COMPUTER PROGRAM PRODUCT FOR REMOTE ROOTKIT DETECTION

(75) Inventor: Krishnapur Narasimhamurthy Venkatasubrahmanyam, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 1147 days.

This patent is subject to a terminal disclaimer.

(21) Appl. No.: 11/392,311

(22) Filed: Mar. 29, 2006

(51) Int. Cl.
*G06F 11/00* (2006.01)

(52) U.S. Cl. .......................... 726/22; 709/224

(58) Field of Classification Search .............. 726/26, 726/1, 22–25; 713/164, 165, 187, 188; 707/1, 707/203; 717/124, 126
See application file for complete search history.

(56) References Cited

U.S. PATENT DOCUMENTS

| | | | | |
|---|---|---|---|---|
| 6,647,400 | B1 * | 11/2003 | Moran | 1/1 |
| 7,017,187 | B1 * | 3/2006 | Marshall et al. | 726/24 |
| 7,032,114 | B1 * | 4/2006 | Moran | 713/187 |
| 7,340,775 | B1 * | 3/2008 | Tarbotton et al. | 726/24 |
| 7,441,273 | B2 * | 10/2008 | Edwards et al. | 726/24 |
| 7,478,237 | B2 * | 1/2009 | Costea et al. | 713/164 |
| 7,530,106 | B1 * | 5/2009 | Zaitsev et al. | 726/24 |
| 7,549,164 | B2 * | 6/2009 | Cook et al. | 726/22 |
| 7,565,690 | B2 * | 7/2009 | Doherty et al. | 726/22 |
| 7,568,231 | B1 * | 7/2009 | Lowe et al. | 726/24 |
| 7,571,482 | B2 * | 8/2009 | Polyakov et al. | 726/24 |
| 7,627,898 | B2 * | 12/2009 | Beck et al. | 726/23 |
| 7,631,357 | B1 * | 12/2009 | Stringham | 726/24 |
| 7,647,308 | B2 * | 1/2010 | Sallam | 707/769 |
| 7,665,137 | B1 * | 2/2010 | Barton et al. | 726/24 |
| 2002/0046275 | A1 * | 4/2002 | Crosbie et al. | 709/224 |
| 2002/0129264 | A1 * | 9/2002 | Rowland et al. | 713/200 |
| 2005/0015606 | A1 * | 1/2005 | Blamires et al. | 713/188 |
| 2005/0240993 | A1 * | 10/2005 | Treadwell et al. | 726/13 |
| 2006/0031476 | A1 * | 2/2006 | Mathes et al. | 709/224 |
| 2006/0031673 | A1 * | 2/2006 | Beck et al. | 713/164 |

(Continued)

FOREIGN PATENT DOCUMENTS

WO 01/16709 3/2001

OTHER PUBLICATIONS

Yi-Min Wang et al, Detecting Stealth Software with Strider GhostBuster, pp. 1-11, Microsoft Corporation, 2005.*

(Continued)

*Primary Examiner* — Nasser Moazzami
*Assistant Examiner* — Shanto M Abedin
(74) *Attorney, Agent, or Firm* — Wong, Cabello, Lutsch, Rutherford & Brucculeri, LLP (57) ABSTRACT

A security system may detect a rootkit by detecting a filesystem configuration of the first system and comparing the filesystem configuration to a known valid filesystem configuration of a second system. The known valid filesystem configuration may be the filesystem configuration of a protected second system, or may be stored in a protected area of the second system. The first and second system may be part of a single device. The filesystem configuration of the first system and the known valid filesystem configuration are compared and differences are analyzed to determine if they are indicative of a rootkit. If a rootkit is detected, some embodiments may provide tools to clean, delete, or quarantine the rootkit. The second system may be provided by a security provider.

16 Claims, 5 Drawing Sheets

U.S. PATENT DOCUMENTS

| | | | |
|---|---|---|---|
| 2006/0041942 A1* | 2/2006 | Edwards | 726/26 |
| 2006/0130144 A1* | 6/2006 | Wernicke | 726/24 |
| 2006/0284632 A1* | 12/2006 | Braverman et al. | 324/765 |
| 2006/0294590 A1* | 12/2006 | Enstone et al. | 726/24 |
| 2006/0294592 A1* | 12/2006 | Polyakov et al. | 726/24 |
| 2007/0022287 A1* | 1/2007 | Beck et al. | 713/164 |
| 2007/0038677 A1* | 2/2007 | Reasor et al. | 707/200 |
| 2007/0067844 A1* | 3/2007 | Williamson et al. | 726/24 |
| 2007/0079178 A1* | 4/2007 | Gassoway | 714/38 |
| 2007/0079373 A1* | 4/2007 | Gassoway | 726/22 |
| 2007/0094654 A1* | 4/2007 | Costea | 717/168 |
| 2008/0109906 A1* | 5/2008 | Sallam | 726/24 |

OTHER PUBLICATIONS

John G. Levine et al, A methodology to Characterize Kernel Level Rootkit Exploits that Overwrite the System Call Table, pp. 1-7, IEEE, 2004.*

Harlan Carvey, Malware analysis for windows administrators, pp. 19-22, Digital Investigation, 2005.*

John G. et al, Detecting and categorizing kernel-level rootkits to aid future detection, pp. 24-32, IEEE, 2006.*

Xin Zhao et al, Towards protecting sensitive files in a comprised system, pp. 1-8, IEEE, 2005.*

* cited by examiner

SYSTEM, METHOD AND COMPUTER PROGRAM PRODUCT FOR REMOTE ROOTKIT DETECTION

FIELD OF THE INVENTION

The present invention relates to security applications, and more particularly to detecting rootkits for security purposes.

BACKGROUND

Increasingly, computer systems have needed to protect themselves against undesirable computer code. Such undesirable computer code has generally taken the form of viruses, worms, Trojan horses, spyware, adware, and so forth. The damage and/or inconvenience capable of being incurred by these types of undesirable code has ranged from mild interference with a program, such as the display of an unwanted political message in a dialog box, to the complete destruction of contents on a hard drive, and even the theft of personal information.

Some types of software are more vulnerable to the above undesirable code than others. For example, rootkits are particularly vulnerable. In some situations, a rootkit may be used to allow hackers to "spoof" system commands, so as to hide directories, files, processes, applications, etc. of their choice. In this way, hackers are able to utilize rootkits to monitor and/or control what transpires between an application and an operating system of a target system.

Unfortunately, currently available security applications do not effectively detect these types of intrusions for a variety of reasons. For instance, operating system commands, files, executables, etc. themselves may be compromised by having been subjected to a rootkit attack. Thus, the security applications used to detect a rootkit attack may themselves be infected by the rootkit attack, rendering them useless.

There is thus a need for overcoming these and/or other problems associated with the prior art.

SUMMARY

A security system, method and computer program product are provided. In use, a file system configuration is identified. Thereafter, a rootkit is detected utilizing the file system configuration.

DETAILED DESCRIPTION

Figure 1:
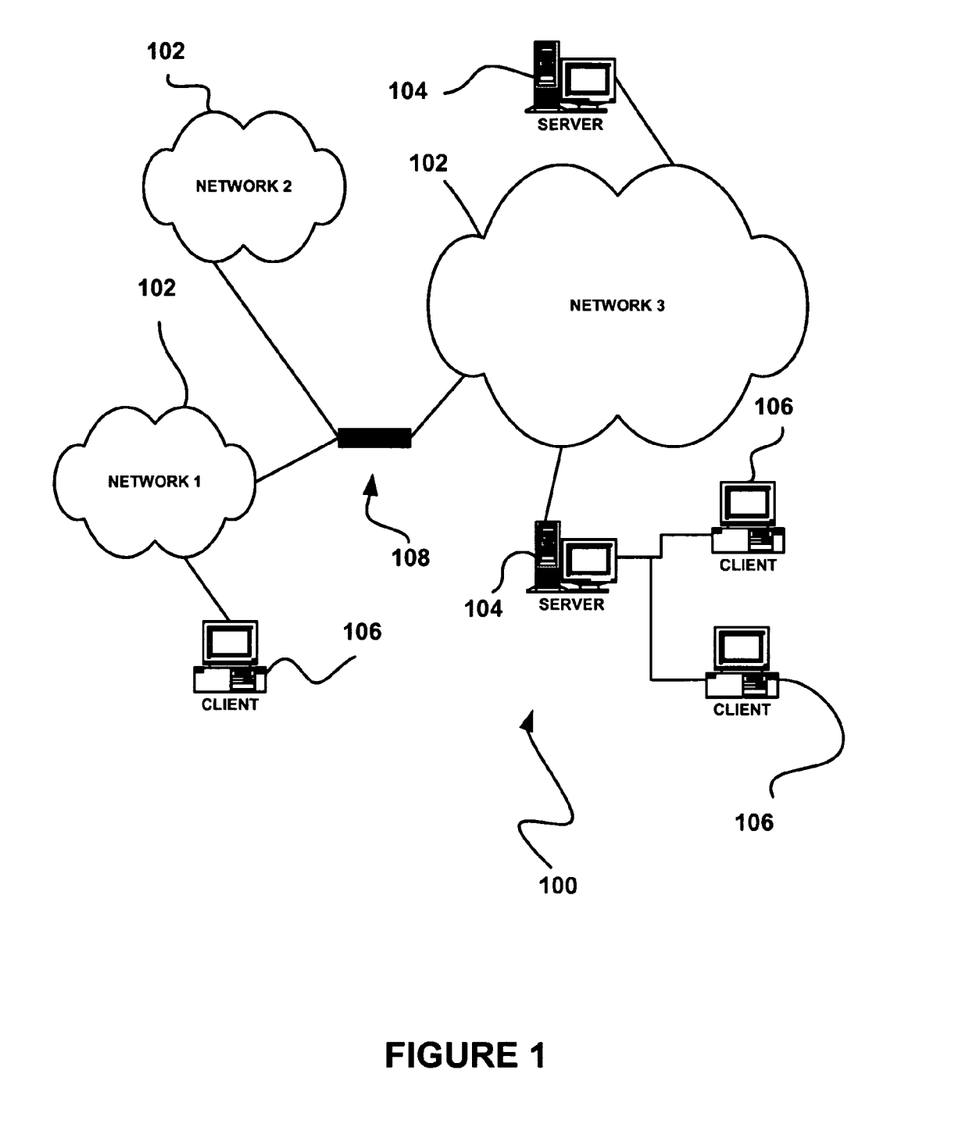
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway 108 is optionally coupled therebetween.

Figure 2:
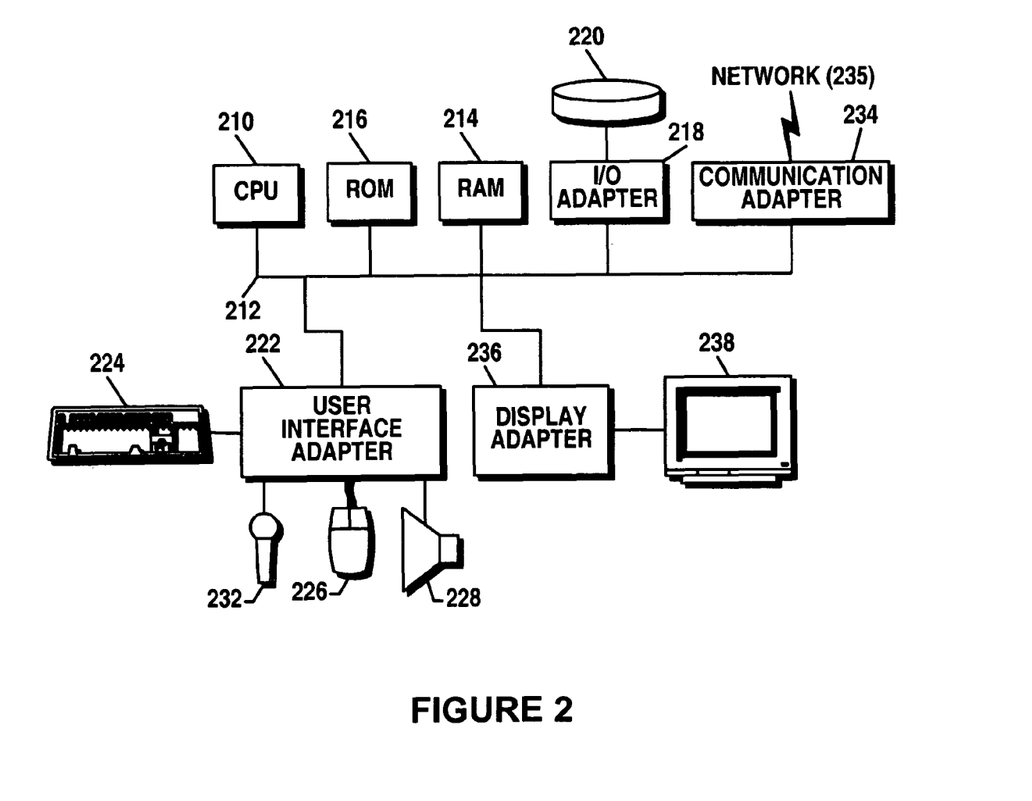
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
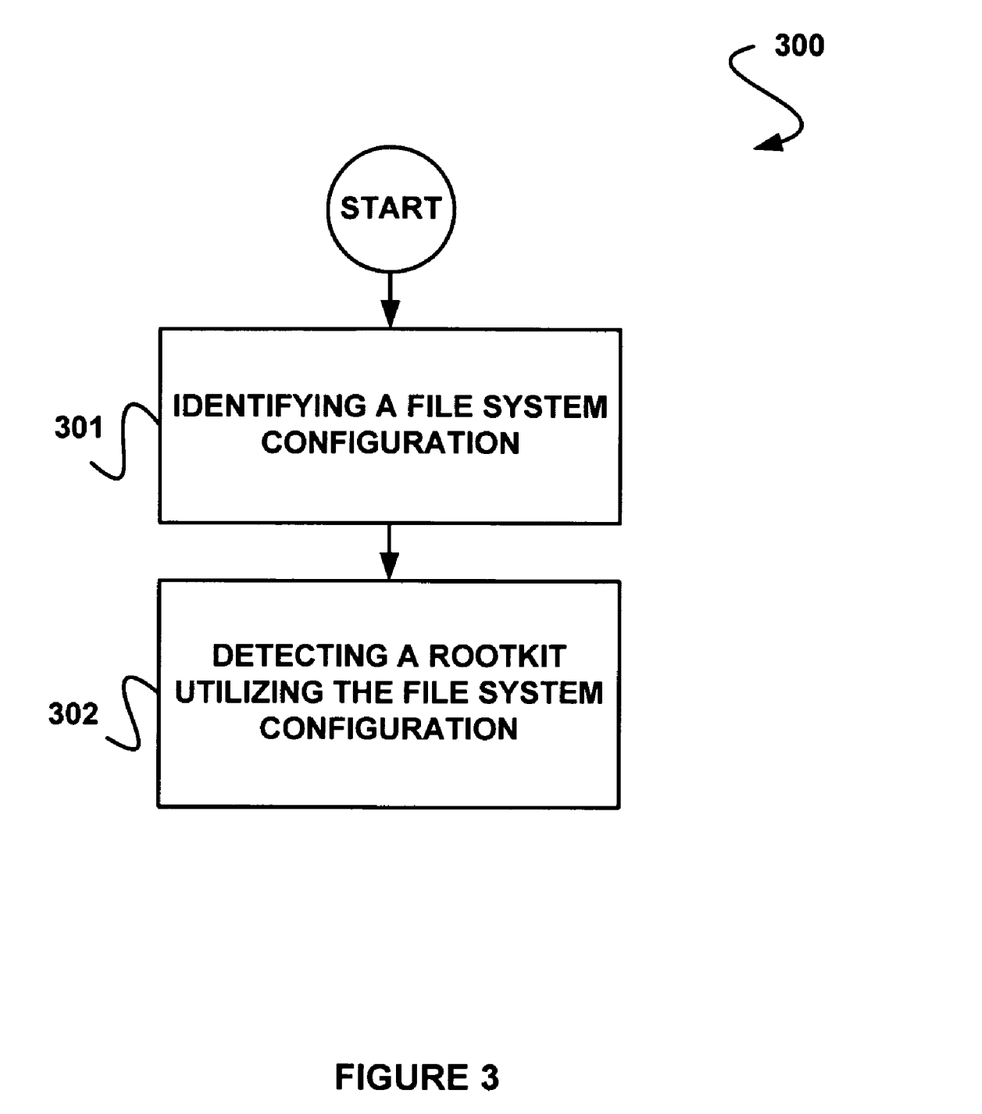
FIG. 3 shows a method for detecting rootkits, in accordance with one embodiment.

FIG. 3 shows a method 300 for detecting rootkits, in accordance with one embodiment. As an option, the method 300 may be implemented in the context of the architecture and environment of FIGS. 1 and/or 2. Of course, however, the method 300 may be carried out in any desired environment.

As shown in operation 302, a file system configuration is identified. The file system configuration may be a virtual file system configuration, a network file system configuration, or any other type of configuration capable of being identified in a file system. In some embodiments, the file system configuration may include, but is not limited to any files, directories, processes, applications, registry entries, and/or any other entity located on the file system.

Still yet, the file system configuration may be identified utilizing any one or more processes running on, for example, any of the devices described above with respect to FIG. 1 (e.g. see, for example, server computers 104, client computers 106, etc.). In one embodiment, the file system configuration of a first device may be identified utilizing a second device. As another option, the file system configuration may be identified utilizing only a single device. More information on exemplary details associated with such embodiments will be set forth hereinafter in greater detail.

The identified file system configuration may then be utilized to detect a rootkit, as shown in operation 304. In the context of the present description, a rootkit may include any computer code capable of allowing a third party or entity to monitor and/or control a device (e.g. see, for example, server computers 104, client computers 106, etc. of FIG. 1) for undesirable purposes. Such undesirable purposes may, in one embodiment, include the insertion of undesirable computer code including, but not limited to malware (e.g. viruses, worms, Trojan horses, etc.), spyware, adware, etc.

In use, the rootkit may be detected by identifying anomalies in the file system configuration. Furthermore, the identified anomalies may be analyzed to determine whether such anomalies are indicative of at least a portion of a rootkit. One optional method of utilizing a file system configuration to detect a rootkit will be described in further detail with respect to FIG. 5. Of course, it should be noted that such rootkit detection may be accomplished in any manner that utilizes the file system configuration.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
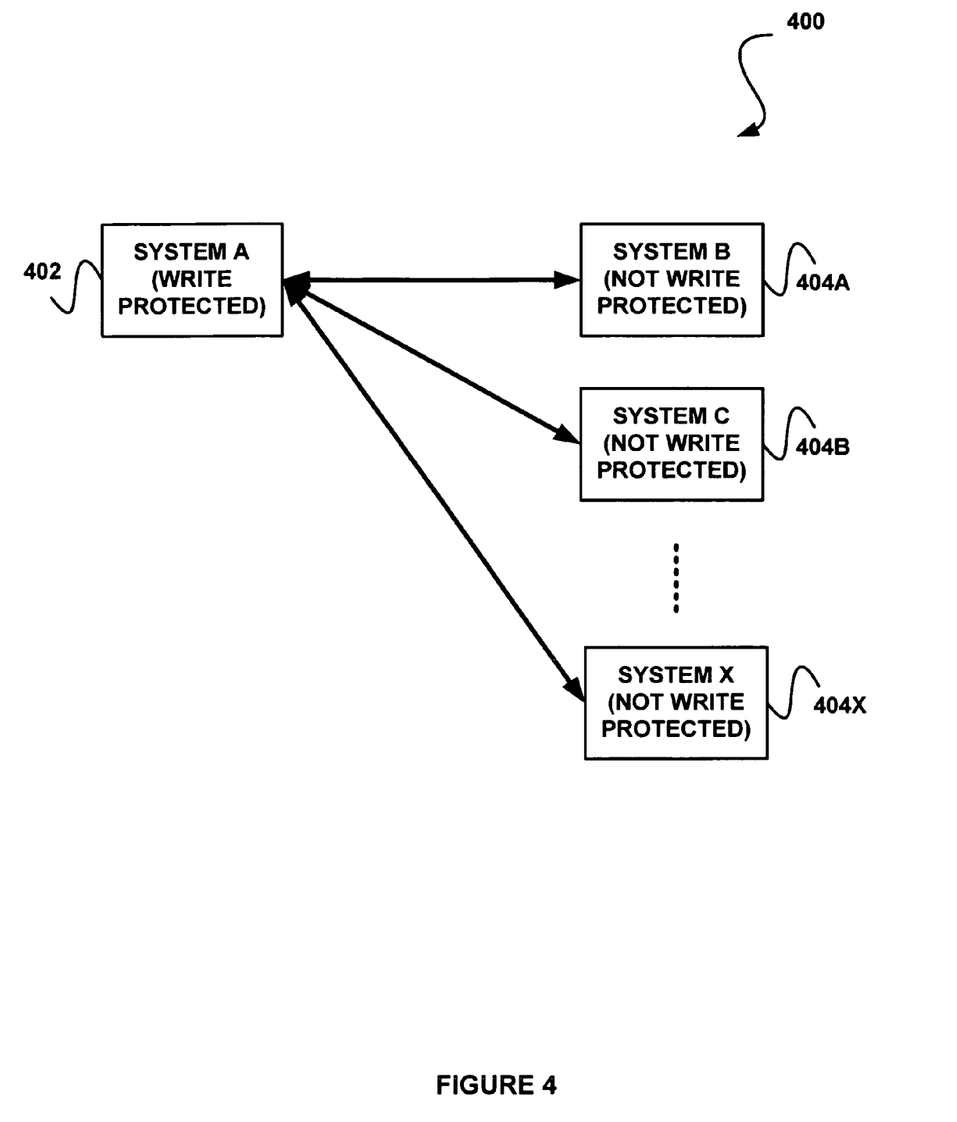
FIG. 4 shows an optional configuration that may be utilized in the context of the method of FIG. 3, in accordance with another embodiment.

FIG. 4 shows an optional configuration 400 that may be utilized in the context of the method of FIG. 3, in accordance with another embodiment. As an option, the configuration 400 may be implemented in the context of the architecture and environment of FIGS. 1-3. Of course, however, the configuration 400 may be used in any desired environment. It should also be noted that the aforementioned definitions may apply during the present description.

As shown, the configuration 400 may include a first system (shown as system A) 402 that is in communication with a plurality of second systems (shown as systems B-X) 404A-X over a network (e.g. see, for example, network(s) 102 of FIG. 1, etc.) coupled between the first system 402 and the second systems 404A-X. In one embodiment, such systems 402, 404A-X may each include any computing device (e.g. see, for example, server computers 104, client computers 106, etc. of FIG. 1) of any same, similar, or different type.

In use, the first system 402 may be able to enter into a remote session mode with respect to any of the second systems 404A-X. Such remote session mode may optionally be a secure session mode whereby the first system 402 is capable of controlling processes run on any of the second systems 404A-X. This may be accomplished, for example, utilizing scripts (e.g. ACTIVEX controls, etc.) installed on the second systems 404A-X that are under the control of the first system 402.

As illustrated, the first system 402 may be write protected. The first system 402 may also, or alternatively, be continuously monitored for purity. Further, the second systems 404A-X may not necessarily be write protected and/or continuously monitored for purity (i.e. for allowing normal usage, etc. thereof). In this way, the processes of the first system 402 may be known to be uncompromised such that the first system 402 may utilize its known uncompromised processes to identify a potentially compromised file system configuration of any of the second systems 404A-X. Since the processes utilized in the first system 402 may be known to be uncompromised, any file system configuration of the second systems 404A-X identified by the first system 402 may be considered an accurate representation of the actual file system configuration located on such second systems 404A-X and optionally in proportion to their compatibility.

While not shown, it should be noted that the first and second systems may be located within a single system. For example, the first system may be located with a protected area of memory. Thus, an uncompromised system (e.g. a CD, hard disk partition, virtual file system, and/or any other component of the single system, etc.) may be essentially used to identify a file system configuration of a compatible potentially compromised system (e.g. any other component(s) of the single system, etc.) to identify rootkits on the potentially compromised system.

While the present embodiment involves the comparison of compatible systems (e.g. same operating system versions, patches, hot fixes, etc) on both the uncompromised and potentially compromised system for accuracy, other embodiments are contemplated that are expanded to dissimilar systems, but with lower expectations with respect to the accuracy of results that are directly proportional to any differences between the compromised and potentially uncompromised system.

Figure 5:
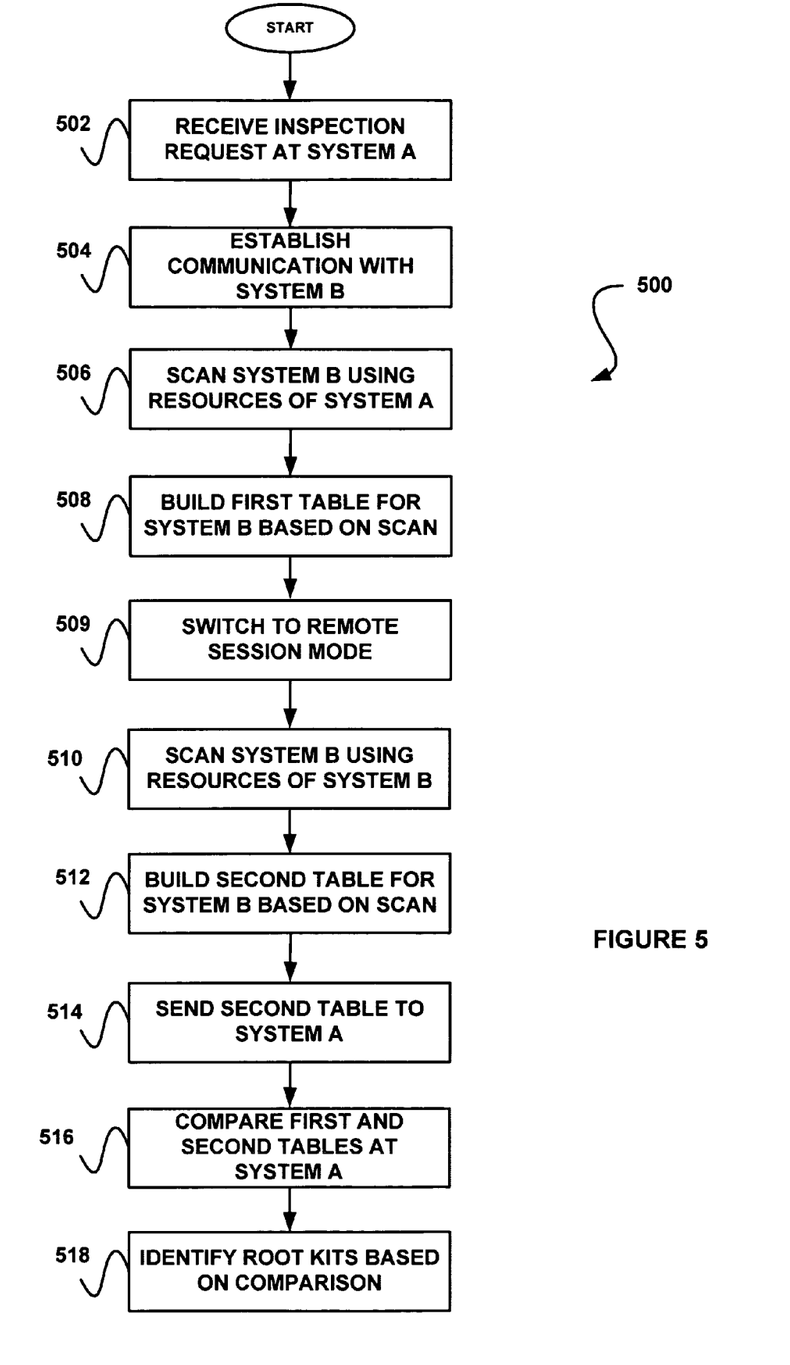
FIG. 5 shows a method for detecting rootkits, in accordance with yet another embodiment.

FIG. 5 shows a method 500 for detecting rootkits, in accordance with yet another embodiment. As an option, the method 500 may be implemented in the context of the architecture and environment of FIGS. 1-4. Of course, however, the method 500 may be carried out in any desired environment. It should also be noted that the aforementioned definitions may apply during the present description.

Initially, an inspection request is received at a first system (shown as system A, for example), as indicated in operation 502. The inspection request may be received automatically or manually. In addition, the inspection request may be received from a user of the first (or a second) system and/or from an administrator located remotely from the first system. In use, the inspection request may include a request for the first system to inspect a second system. In other embodiments, the request may be initiated in the event the second system is compromised beyond use, as will be set forth hereinafter in greater detail.

Once the inspection request is received in operation 502, communication is established between the first system and the second system for which the inspection is requested. Note operation 504. Again, as described above with respect to FIG. 4, the first system may be write protected and/or continuously monitored for purity such that it is a system uncompromised by undesirable code, whereas the second system may be unprotected such that it may be a potentially compromised system.

Next, the first system scans the second system using the resources of the first system. See operation 506. For example, such resources may include any hardware and/or software associated with the first system (e.g. installed thereon, etc.), where the resources are capable of scanning the second system to identify a first file system configuration of the second system. Thus, the uncompromised resources of the first system may be utilized to identify an accurate file system configuration of the second system.

The first system may then utilize the identified first file system configuration to generate a first table associated with the second system. See operation 508. For example, the first table may identify directories, files, processes, applications, registry entries and/or any other data associated with the second system, in the form of a list or any other data structure. Of course, the identified first file system configuration may itself be the first table, such that the scan in operation 506 directly generates the first table.

After the first system generates the first table in operation 508, the first system then switches to a remote session mode 509. As described above with respect to FIG. 4, the remote session mode may be a secure remote session mode. One exemplary remote session mode that may optionally be used includes MICROSOFT WINDOWS XP Remote Desktop and Remote Assistance. Of course, any remote session may be utilized, per the desires of the user.

The remote session mode may then be utilized by the first system to remotely scan the second system using the resources of the second system. See operation 510. In this way, a second file system configuration may be identified using the resources of the potentially compromised second system. Again, the resources of the second system may include any hardware and/or software associated with the second system (e.g. installed thereon, etc.), where such resources are capable of scanning the second system to identify the file system configuration.

Since the potentially compromised resources of the second system are utilized in the above manner, the second identified file system configuration may or may not be an accurate representation of the actual file system configuration of the second system (e.g. due to the presence of a compromised rootkit, etc.). Specific examples of such first and second file system configurations will be described in more detail further below.

From such second identified file system configuration, a second table may be generated, as shown in operation 512. As described above with respect to the first table, the second table may identify directories, files, processes, applications, registry entries and/or any other data associated with the second system, in the form of a list or any other data structure. Of course, the second identified file system configuration may itself be the second table, such that the scan in operation 510 directly generates the second table.

It may be noted that, in the event that the resources of the second system have been compromised to an extent that operation 510 is rendered impossible thereby limiting the utilization of the second system for table generation, one embodiment may involve the generation of the resources of the first system as the first table and generating the second table on the resources of the second system using its own resources, without utilizing the resources of the second system, as long as a connection is established between the two systems. Comparison with respect to the first systems resources would still allow rootkit detection. Again, the accuracy of the comparison report may be dependent on the compatibility between the two systems. In other words, the first system self-detects its resources and builds the first table. It then utilizes its own uncompromised resources to detect the resources of the second compromised system and builds the second table.

Once the second table is generated in operation 512, the second table may be sent from the second system to the first system, as shown in operation 514. Since the first system may be write protected, the second table may be sent to a secure area of the first system with write permissions. In other embodiments, the method 500 may involve writing the tables generated in operations 508 and 512 to any other secure area on the network for the purpose of comparison. The first system may then compare the first and second tables at the first system or at a secure location on the network where the tables reside. See operation 516.

In the case where the first and second identified file system configurations are themselves the first and second tables, respectively, the first system may compare the first and second file system configurations. It should be noted that the scan utilizing the resources of the first system (operation 506) and the scan utilizing the resources of the second system (operation 510) may be performed in a synchronized manner or in any other manner capable of making sure that the file system configuration of the second system has not substantially changed between scans, thus eliminating any false discrepancies between such scan results.

From such comparison in operation 516, at least one rootkit may be detected, as in operation 518. Optionally, any differences detected based on the comparison in operation 516 may be further analyzed to determine if such differences are indicative of a rootkit. While such rootkit may include any entity that falls within the aforementioned definition, it may, in one embodiment, include directories, files, processes, applications, registry entries and/or any other code that monitors/tracks passwords, keystrokes, and incoming/outgoing network traffic; collects information (on any system on the network); alters log files; compromises system commands at a kernel level; masks the fact that a particular system is compromised (e.g. by altering existing system tools, etc.), etc.; thereby providing administrative-level access to an intruder.

Still yet, an action may be taken with respect to the detected rootkits. For instance, the detected rootkits may be cleaned, deleted, quarantined, etc. Of course, any action taken may be in response to a request made by a user of the second system, an administrator, a user of the first system; and/or may be in response to a predefined policy.

Thus, the method 500 provides a system for detecting rootkits based on a file system configuration comparison. Specifically, by utilizing an uncompromised system to identify a file system configuration of a potentially compromised system, rootkits in the potentially compromised system are unable to hide by corrupting processes of the potentially compromised system.

For example, in one embodiment, a rootkit may be located on a second system, where such rootkit compromises any file and/or directory (DIR) command performed by the second system. The DIR command may be compromised on the second system such that such system will not return a full listing of files and/or directories, thereby allowing the rootkit and associated unwanted data to be undetected by such command. Therefore, an uncompromised first system may utilize its own uncompromised DIR command on the second system to receive an accurate listing of all files and/or directories located on the second system. Results of the DIR command run from the first system and the second system may then be compared, and any discrepancies may be utilized to detect the unwanted rootkit.

As another example, a rootkit may be located on a second system, where such rootkit compromises task manager results presented by the second system. Thus, when the task manager is run from the uncompromised first system on the second system, the task manager may return all running processes on the second system. However, if the task manager is run from the second system, the task manager may only return a portion of processes running on the second system, such that potentially unwanted processes may be hidden by the rootkit. The comparison of these task manager results may be utilized to identify any discrepancies, and thus any rootkits located on the second system.

As yet another example, similar methods may be used for detecting compromised registry commands, and/or any other data that may be compromised by a rootkit. For example, security systems utilized by a system containing a rootkit may be compromised such that the security systems do not work properly to eliminate undesirable code. Thus, the method 500 provides a way to detect unwanted data that could otherwise be hidden by a rootkit.

It should be noted that, in the above described embodiments, the uncompromised first system may optionally be a system maintained by a security provider. Such uncompromised system may then be provided to users, such that users may utilize such uncompromised system to scan and/or clean their own potentially compromised systems. Specifically, the uncompromised system may be provided to users over the Internet. Of course, the uncompromised system may be provided for use for a fee, such as a subscription or a one time fee.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by detecting rootkits, etc., which may be used to combat cyber-terrorism.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
    identifying a file system configuration of a first computer system and a second computer system, comprising:
        receiving a request to inspect the second computer system by the first computer system;
        identifying a first configuration of a file system of the second computer system using resources of the first computer system;
        initiating a remote session on the second computer system from the first computer system; and
        identifying a second configuration of the file system of the second computer system using resources of the second computer system;
    detecting a rootkit on the second computer system, comprising;
        comparing the first configuration and the second configuration; and
    performing an action with respect to the detected rootkit in response to a predefined policy,
    wherein the first computer system is a write-protected system.

2. The method of claim 1, wherein the file system is a virtual file system.

3. The method of claim 1, wherein the file system is a network file system.

4. The method of claim 1, wherein the act of initiating a remote session on the second computer system from the first computer system utilizes a network coupled between the first system and the second system.

5. The method of claim 1, wherein the act of identifying a first configuration of a file system of the second computer system is performed upon receiving the request to inspect at the first system.

6. The method of claim 1, wherein the act of comparing the first configuration and the second configuration comprises:
    generating a first table from the first configuration;
    generating a second table from the second configuration; and
    comparing the first table and the second table.

7. The method of claim 1, wherein the second configuration identifies at least one of directories, files, processes, registry entries, and applications associated with the second system.

8. The method of claim 6, wherein the first table and the second table are each in a form of a list.

9. The method of claim 6,
    wherein the act of generating a first table from the first configuration is performed by the first computer system,
    wherein the act of generating a second table from the second configuration is performed by the second computer,
    further comprising: sending the second table to a secure area of the first computer system by the second computer system.

10. The method of claim 1, wherein the resources of the second computer system include software installed on the second computer system.

11. The method of claim 1, wherein the act of receiving a request to inspect the second computer system by the first computer system comprises:
    receiving a request to inspect the second computer system from an administrator located remotely from the first system.

12. A non-transitory computer readable medium on which is stored a computer program product, comprising:
    computer code for identifying a file system configuration, comprising
        computer code for receiving a request to inspect a second computer system by a first computer system;
        computer code for identifying a first configuration of a file system of the second computer system using resources of the first computer system;
        computer code for initiating a remote session on the second computer system from the first computer system; and
        computer code for identifying a second configuration of the file system of the second computer system using resources of the second computer system;
    computer code for detecting a rootkit on the second computer system, comprising;
        comparing the first configuration and the second configuration,
    computer code for performing an action with respect to the detected rootkit in response to a predefined policy,
    wherein the first computer system is a write-protected system.

13. A system, comprising:
    a first computer, comprising:
        a first processor;
    a second computer in communication with the first computer, comprising
        a second processor; and
        a file system, coupled to the second processor; and
    a first software, comprising instructions that when executed cause the first processor to performs actions comprising:

receiving a request to inspect the second computer by the first computer;

identifying a first configuration of the file system using resources of the first computer;

initiating a remote session on the second computer from the first computer; and identifying a second configuration of the file system using resources of the second computer;

detecting a rootkit on the second computer by comparing the first configuration and the second configuration; and performing an action with respect to the detected rootkit in response to a predefined policy, wherein the first computer is write-protected.

14. The system of claim 13, wherein the file system is a virtual file system.

15. The system of claim 13, wherein the action of comparing the first configuration and the second configuration comprises:
   generating a first table from the first configuration;
   generating a second table from the second configuration; and
   comparing the first table and the second table.

16. The system of claim 13, wherein the second configuration identifies at least one of directories, files, processes, registry entries, and applications associated with the second computer.

* * * * *